(12) United States Patent
Johnson et al.

(10) Patent No.: US 7,785,693 B2
(45) Date of Patent: Aug. 31, 2010

(54) COMPOSITE LAMINATE STRUCTURE

(75) Inventors: David W. Johnson, San Diego, CA (US); Scott A. Garrett, San Diego, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 98 days.

(21) Appl. No.: 12/333,155

(22) Filed: Dec. 11, 2008

(65) Prior Publication Data

US 2009/0214849 A1    Aug. 27, 2009

Related U.S. Application Data

(63) Continuation-in-part of application No. 11/745,350, filed on May 7, 2007, which is a continuation of application No. 10/744,630, filed on Dec. 23, 2003, now Pat. No. 7,217,453, which is a continuation of application No. 10/059,956, filed on Nov. 19, 2001, now Pat. No. 6,676,785.

(60) Provisional application No. 60/298,523, filed on Jun. 15, 2001, provisional application No. 60/281,838, filed on Apr. 6, 2001, provisional application No. 60/293,939, filed on May 29, 2001.

(51) Int. Cl.
*B32B 3/06* (2006.01)
(52) U.S. Cl. .................. 428/99; 428/102; 428/292.1; 428/317.9
(58) Field of Classification Search .................. 428/99, 428/102, 292.1, 317.9
See application file for complete search history.

(56) References Cited

U.S. PATENT DOCUMENTS

| | | | | | |
|---|---|---|---|---|---|
| 2,641,561 | A | * | 6/1953 | Black | 343/872 |
| 2,692,219 | A | * | 10/1954 | Slayter et al. | 428/102 |
| 2,762,739 | A | | 9/1956 | Weiss | |
| 2,954,001 | A | | 9/1960 | Luxenburg | |
| 3,211,115 | A | | 10/1965 | Burillon et al. | |
| 3,230,995 | A | | 1/1966 | Shannon | |
| 3,241,508 | A | | 3/1966 | Chezaud et al. | |

(Continued)

FOREIGN PATENT DOCUMENTS

GB    1275705    5/1972

(Continued)

OTHER PUBLICATIONS

International Search Report/Written Opinion issued in PCT/US07/74080 on Jul. 22, 2008.

(Continued)

*Primary Examiner*—N. Edwards
(74) *Attorney, Agent, or Firm*—Stephen C. Beuerle; Procopio Cory Hargreaves & Savitch LLP

(57) ABSTRACT

A composite laminate structure includes a first skin; a second skin; a core between the first skin and the second skin, the core including adjacent core sections and a Z-Y partition separating the adjacent core sections; and a plurality of distinct groupings of Z-axis fibers that extend from the first skin to the second skin through the adjacent core sections and the Z-Y partition separating the adjacent core sections.

17 Claims, 6 Drawing Sheets

U.S. PATENT DOCUMENTS

| | | |
|---|---|---|
| 3,328,218 A | 6/1967 | Noyes |
| 3,647,606 A | 3/1972 | Notaro |
| 3,761,345 A | 9/1973 | Smith |
| 3,833,695 A | 9/1974 | Vidal |
| 3,837,985 A | 9/1974 | Chase |
| 3,870,580 A | 3/1975 | Belcher |
| 3,948,194 A | 4/1976 | Gunold |
| 3,993,523 A | 11/1976 | Hunt et al. |
| 4,032,383 A | 6/1977 | Goldsworthy et al. |
| 4,059,468 A | 11/1977 | Bouillon |
| 4,077,340 A | 3/1978 | Braum et al. |
| 4,080,915 A | 3/1978 | Bompard et al. |
| 4,196,251 A | 4/1980 | Windecker |
| 4,206,895 A | 6/1980 | Olez |
| 4,218,276 A | 8/1980 | King |
| 4,223,053 A | 9/1980 | Brogan |
| 4,256,790 A | 3/1981 | Lackman et al. |
| 4,291,081 A | 9/1981 | Olez |
| 4,299,871 A | 11/1981 | Forsch |
| 4,331,091 A | 5/1982 | Parker et al. |
| 4,335,176 A | 6/1982 | Baumann |
| 4,402,778 A | 9/1983 | Goldsworthy |
| 4,420,359 A | 12/1983 | Goldsworthy |
| 4,495,231 A | 1/1985 | Laskaris et al. |
| 4,495,235 A | 1/1985 | Tesch |
| 4,498,941 A | 2/1985 | Goldsworthy |
| 4,506,611 A | 3/1985 | Parker et al. |
| 4,528,051 A | 7/1985 | Heinze et al. |
| 4,541,349 A | 9/1985 | Inoue |
| 4,571,355 A | 2/1986 | Elrod |
| 4,628,846 A | 12/1986 | Vives |
| 4,752,513 A | 6/1988 | Rau et al. |
| 4,761,871 A | 8/1988 | O'Connor et al. |
| 4,808,461 A | 2/1989 | Boyce et al. |
| 4,854,250 A | 8/1989 | Stuvecke et al. |
| 4,913,937 A | 4/1990 | Engdahl et al. |
| 4,917,756 A | 4/1990 | Cahuzac et al. |
| 4,955,123 A | 9/1990 | Lawton et al. |
| 4,963,408 A | 10/1990 | Huegli |
| 4,983,453 A | 1/1991 | Beall |
| 5,055,242 A | 10/1991 | Vane |
| 5,095,833 A | 3/1992 | Darrieux |
| 5,186,776 A | 2/1993 | Boyce et al. |
| 5,286,320 A | 2/1994 | McGrath et al. |
| 5,314,282 A | 5/1994 | Murphy et al. |
| 5,324,377 A | 6/1994 | Davies |
| 5,327,621 A | 7/1994 | Yasui et al. |
| 5,333,562 A | 8/1994 | LeMaire et al. |
| 5,361,483 A | 11/1994 | Rainville et al. |
| 5,373,796 A | 12/1994 | Besemann |
| 5,429,853 A | 7/1995 | Darrieux |
| 5,445,693 A | 8/1995 | Vane |
| 5,445,860 A | 8/1995 | Bova |
| 5,445,861 A | 8/1995 | Newton et al. |
| 5,466,506 A | 11/1995 | Freitas et al. |
| 5,490,602 A | 2/1996 | Wilson et al. |
| 5,549,771 A | 8/1996 | Brooker |
| 5,580,514 A | 12/1996 | Farley |
| 5,589,015 A | 12/1996 | Fusco et al. |
| 5,589,243 A | 12/1996 | Day |
| 5,624,622 A | 4/1997 | Boyce et al. |
| 5,632,844 A | 5/1997 | Pate et al. |
| 5,639,410 A | 6/1997 | Amaike et al. |
| 5,642,679 A | 7/1997 | Monget et al. |
| 5,667,859 A | 9/1997 | Boyce et al. |
| 5,681,408 A | 10/1997 | Pate et al. |
| 5,736,222 A | 4/1998 | Childress |
| 5,741,574 A | 4/1998 | Boyce et al. |
| 5,759,321 A | 6/1998 | Cahuzac |
| 5,770,155 A | 6/1998 | Dunphy et al. |
| 5,778,806 A | 7/1998 | Badillo |
| 5,789,061 A | 8/1998 | Campbell et al. |
| 5,809,805 A | 9/1998 | Palmer et al. |
| 5,827,383 A | 10/1998 | Campbell et al. |
| 5,829,373 A | 11/1998 | Baxter |
| 5,832,594 A | 11/1998 | Avila |
| 5,834,082 A | 11/1998 | Day |
| 5,862,975 A | 1/1999 | Childress |
| 5,863,635 A | 1/1999 | Childress |
| 5,868,886 A | 2/1999 | Alston et al. |
| 5,869,165 A | 2/1999 | Rorabaugh et al. |
| 5,873,973 A | 2/1999 | Koon et al. |
| 5,876,540 A | 3/1999 | Pannell |
| 5,876,652 A | 3/1999 | Rorabaugh et al. |
| 5,876,832 A | 3/1999 | Pannell |
| 5,882,756 A | 3/1999 | Alston et al. |
| 5,882,765 A | 3/1999 | Pastureau et al. |
| 5,888,329 A * | 3/1999 | Cho et al. ............. 156/93 |
| 5,916,469 A | 6/1999 | Scoles et al. |
| 5,919,413 A | 7/1999 | Avila |
| 5,935,475 A | 8/1999 | Scoles et al. |
| 5,935,680 A | 8/1999 | Childress |
| 5,935,698 A | 8/1999 | Pannell |
| 5,941,185 A | 8/1999 | Selbach et al. |
| 5,958,550 A | 9/1999 | Childress |
| 5,968,639 A | 10/1999 | Childress |
| 5,972,524 A | 10/1999 | Childress |
| 5,980,665 A | 11/1999 | Childress |
| 6,027,798 A | 2/2000 | Childress |
| 6,051,089 A | 4/2000 | Palmer et al. |
| 6,090,465 A | 7/2000 | Steele et al. |
| 6,106,646 A | 8/2000 | Fairbanks |
| 6,117,260 A | 9/2000 | Rossi |
| 6,128,998 A | 10/2000 | Freitas et al. |
| 6,132,859 A | 10/2000 | Jolly |
| 6,139,942 A | 10/2000 | Hartness et al. |
| 6,151,089 A | 11/2000 | Yang et al. |
| 6,151,439 A | 11/2000 | Wainwright |
| 6,187,411 B1 | 2/2001 | Palmer |
| 6,190,602 B1 | 2/2001 | Blaney et al. |
| 6,196,145 B1 | 3/2001 | Burgess |
| 6,291,049 B1 | 9/2001 | Kunkel et al. |
| 6,454,889 B1 | 9/2002 | Hendrix et al. |
| 6,632,309 B1 | 10/2003 | Hendrix et al. |
| 6,645,333 B2 | 11/2003 | Johnson et al. |
| 6,808,142 B2 | 10/2004 | Oki |
| 7,393,577 B2 * | 7/2008 | Day et al. ............. 428/121 |
| 2001/0031350 A1 | 10/2001 | Day et al. |
| 2002/0014302 A1 | 2/2002 | Fanucci et al. |
| 2002/0069503 A1 | 6/2002 | Sentmanat |
| 2002/0144767 A1 | 10/2002 | Johnson et al. |
| 2002/0153084 A1 | 10/2002 | Johnson et al. |
| 2005/0074593 A1 | 4/2005 | Day et al. |

FOREIGN PATENT DOCUMENTS

| | | |
|---|---|---|
| GB | 2245862 | 1/1992 |
| WO | WO 92/00845 A1 | 1/1992 |
| WO | WO 98/08271 | 2/1998 |
| WO | WO 03/011576 A1 | 2/2003 |

OTHER PUBLICATIONS

Stanley et al., "Development and Evaluation of Stitched Sandwich Panels", NASA-CR 2001-211025, Jun. 2001.

Martin, et al. "Pultrusion," Engineered Materials Handbook, vol. 1, Composites, ASM International, 1989, pp. 533-543.

Gabriele, M., "Pultrusion's Promise," Plastics Technology, Mar. 1995, pp. 36-40.

* cited by examiner

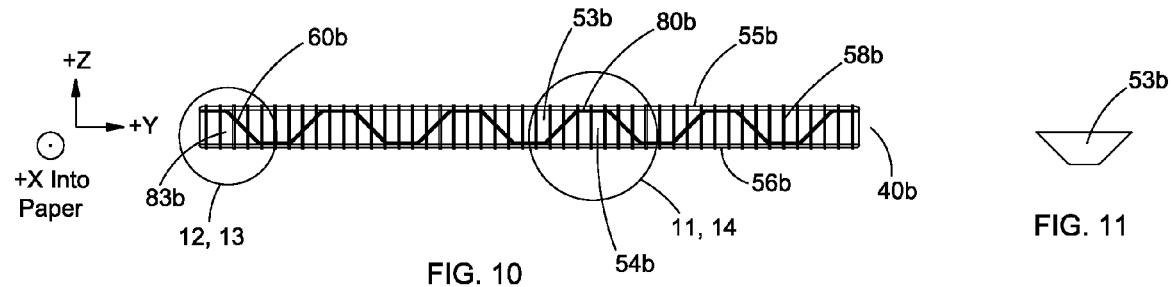
FIG. 10
FIG. 11
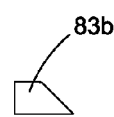
FIG. 12
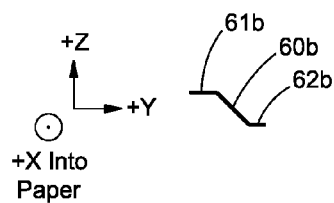
FIG. 13
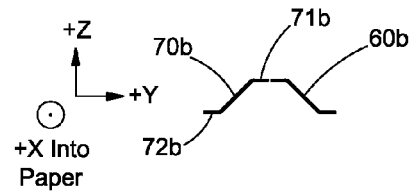
FIG. 14

COMPOSITE LAMINATE STRUCTURE

CROSS-REFERENCE TO RELATED APPLICATION

This application is a continuation-in-part of U.S. patent application Ser. No. 11/745,350 filed May 7, 2007, which is a continuation of U.S. patent application Ser. No. 10/744,630 filed Dec. 23, 2003, which issued as U.S. Pat. No. 7,217,453 on May 15, 2007, which is a continuation of U.S. patent application Ser. No. 10/059,956 filed Nov. 19, 2001, which issued as U.S. Pat. No. 6,676,785 on Jan. 13, 2004, which claims the benefit of provisional patent application No. 60/298,523 filed on Jun. 15, 2001, provisional patent application 60/281,838 filed on Apr. 6, 2001 and provisional patent application, 60/293,939 filed on May 29, 2001. All of these applications/patents are incorporated by reference herein as though set forth in full.

TECHNICAL FIELD

The present invention relates to an improvement in the field of composite laminate structures known as sandwich structures formed with outside skins of a polymer matrix composite and an internal core of either foam, end-grain balsa wood, or honeycomb, and more specifically to the field of these sandwich structures which additionally have some type of Z-axis fiber reinforcement through the composite laminate and normal to the plane of the polymer matrix composite skins.

BACKGROUND ART

U.S. Pat. No. 7,217,453 discloses a composite laminate sandwich structure including outside skins of a polymer matrix composite, an internal core, and a Z-axis fiber reinforcement through the composite laminate and normal to the plane of the polymer matrix composite skins. The composite laminate sandwich structure disclosed in U.S. Pat. No. 7,217,453 is excellent for many applications. The inventors of the present invention, some of who are the same as the inventors of U.S. Pat. No. 7,217,453, have developed a new composite laminate sandwich structure that is ideal for applications where a higher shear modulus, greater stiffness, less deflection, and higher load-carrying capability are required.

SUMMARY OF INVENTION

Accordingly, aspects of the invention involve a method and an apparatus for forming continuously and automatically a 3-D Z-axis reinforced composite laminate structure that has a higher shear modulus, greater stiffness, less deflection, and higher load-carrying capability than the composite laminate sandwich structure disclosed in U.S. Pat. No. 7,217,453. The 3-D Z-axis reinforced composite laminate structure includes a sandwich panel combining high-shear Z-Y partitions and 3D-fiber insertions.

In another aspect of the invention, the composite laminate structure includes a first skin; a second skin; a core between the first skin and the second skin, the core including adjacent core sections and a Z-Y partition separating the adjacent core sections; and a plurality of distinct groupings of Z-axis fibers that extend from the first skin to the second skin through the adjacent core sections and the Z-Y partition separating the adjacent core sections.

Other and further objects, features, aspects, and advantages of the present inventions will become better understood with the following detailed description of the accompanying drawings.

DESCRIPTION OF THE DRAWINGS

FIG. 10 is a vertical cross-sectional view of an embodiment of a 3-D Z-axis reinforced composite laminate structure including a sandwich panel combining high-shear Z-Y partitions and 3D-fiber insertions;

FIG. 11 is a vertical cross-sectional view of an embodiment of a trapezoidal foam member of the 3-D Z-axis reinforced composite laminate structure of FIG. 10;

FIG. 12 is a vertical cross-sectional view of an embodiment of a half-trapezoidal foam member of the 3-D Z-axis reinforced composite laminate structure of FIG. 10;

FIG. 13 is a vertical cross-sectional view of an embodiment of a Z-Y partition of the 3-D Z-axis reinforced composite laminate structure of FIG. 10; and FIG. 14 is a vertical cross-sectional view of another embodiment of a Z-Y partition of the 3-D Z-axis reinforced composite laminate structure of FIG. 10.

DESCRIPTION OF PREFERRED EMBODIMENT

Before describing embodiments of a method and an apparatus for forming continuously and automatically an embodiment of a 3-D Z-axis reinforced composite laminate structure including a sandwich panel combining high-shear Z-Y partitions and 3D-fiber insertions, a method and apparatus for forming a pultruded and clinched 3-D Z-axis fiber reinforced composite laminate structure will first be described.

Figure 1:
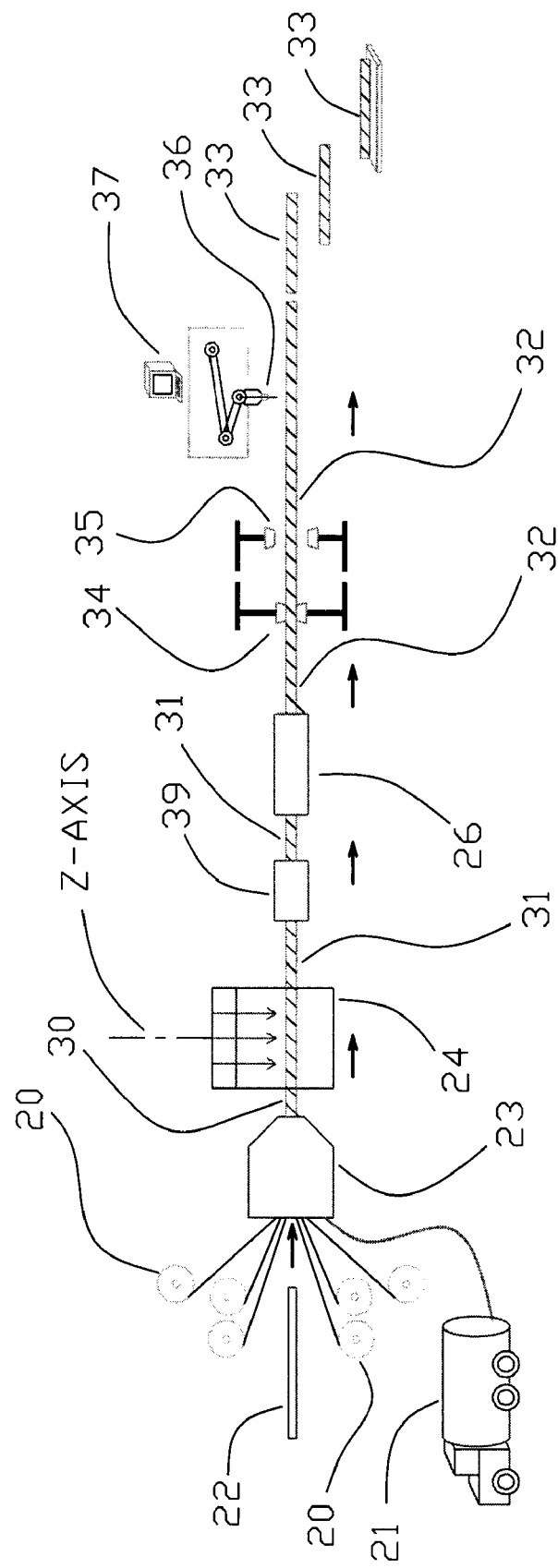
FIG. 1 is a schematic illustration of a method and apparatus for forming continuously and automatically the subject 3-D Z-axis reinforced composite laminate structure.

FIG. 1 illustrates a method and apparatus for forming a pultruded and clinched 3-D Z-axis fiber reinforced composite laminate structure. The pultrusion direction is from left-to-right in FIG. 1 as shown by the arrows. The key components of the apparatus will become evident through the following description.

Shown in FIG. 1 are the grippers 34 and 35. These are typically hydraulically actuated devices that can grip a completely cured composite laminate panel 32 as it exits pultrusion die 26. These grippers operate in a hand-over-hand method. When gripper 34 is clamped to the panel 32, it moves a programmed speed in the direction of the pultrusion, pulling the cured panel 32 from the die 26. Gripper 35 waits until the gripper 34 has completed its full stroke and then takes over.

Upstream of these grippers, the raw materials are pulled into the die in the following manner. It should be recognized that all of the raw material is virgin material as it arrives from various manufacturers at the far left of FIG. 1. The fiber 20 can be glass fiber, either in roving rolls with continuous strand mat or it can be fabric such as x-y stitched fabric or woven roving. Besides glass, it can be carbon or aramid or other reinforcing fiber. A core material 22 is fed into the initial forming of the sandwich preform. The skins of the sandwich will be formed from the layers of fiber 20 on both the top and bottom of the sandwich preform 30. The core 22 will be the central section of the sandwich. The core can be made of urethane or PVC foam, or other similar foams in densities from 2 lbs. per cubic foot to higher densities approaching 12 lbs. per cubic foot. Alternatively core 22 could be made of end-grain balsa wood having the properties of 6 lb. per cubic foot density to 16 lb. per cubic foot.

The raw materials are directed, automatically, in the process to a guidance system in which resin from a commercial source 21 is directed to a primary wet-out station within resin tank 23. The wetted out preform 30 exits the resin tank and its debulking station in a debulked condition, such that the thickness of the panel section 30 is very nearly the final thickness of the ultimate composite laminate. These panels can be any thickness from 0.25 inches to 4 inches, or more. The panels can be any width from 4 inches wide to 144 inches wide, or more. Preform 30 is then directed to the Z-axis fiber deposition machine 24 that provides the deposition of 3-D Z-axis groupings of fiber filaments. The details as to how Z-axis filter deposition machine 24 functions is the subject of U.S. Pat. No. 6,645,333, which is incorporated by reference herein as though set forth in full. This system is computer controlled so that a wide variety of insertions can be made. Machine 24 can operate while stationary or can move synchronously with the gripper 34 speed. Groupings of fiber filaments are installed automatically by this machine into the preform 31 that is then pulled from the Z-axis fiber deposition machine 24. Preform 31 has been changed from the preform 30 by only the deposition of 3-D Z-axis groupings of fiber filaments, all of which are virgin filaments as they have arrived from the manufacturer, such as Owens Corning.

Modified preform 31 of FIG. 1 now automatically enters a secondary wet-out station 39. Station 39 can be the primary wet-out, eliminating station 23, as an alternative method. This station helps in the completion of the full resin wet-out of the composite laminate structure, including the 3-D Z-axis groupings of fiber filaments. Preform 31 then enters pultrusion die 26 mentioned earlier and through heat preform 31 is brought up in temperature sufficiently to cause catalyzation of the composite laminate panel. Exiting die 26 is the final cured panel section 32 which is now structurally strong enough to be gripped by the grippers 34 and 35.

The sandwich structure of FIG. 1 can then be made any length practicable by handling and shipping requirements. Downstream of the grippers 34 and 35, the preform 32 is actually being "pushed" into the downstream milling machine system, 36 and 37. Here a multi-axis CNC machine (computer numerical control) moves on a gantry synchronous with the gripper pull speed, and can machine details into the composite laminate structure/panel on the fly. These can be boltholes, edge routing, milling, or cut-off. The machine 36 is the multi-axis head controlled by the computer 37. After cut-off, the part 33 is removed for assembly or palletizing and shipping.

Figure 2:
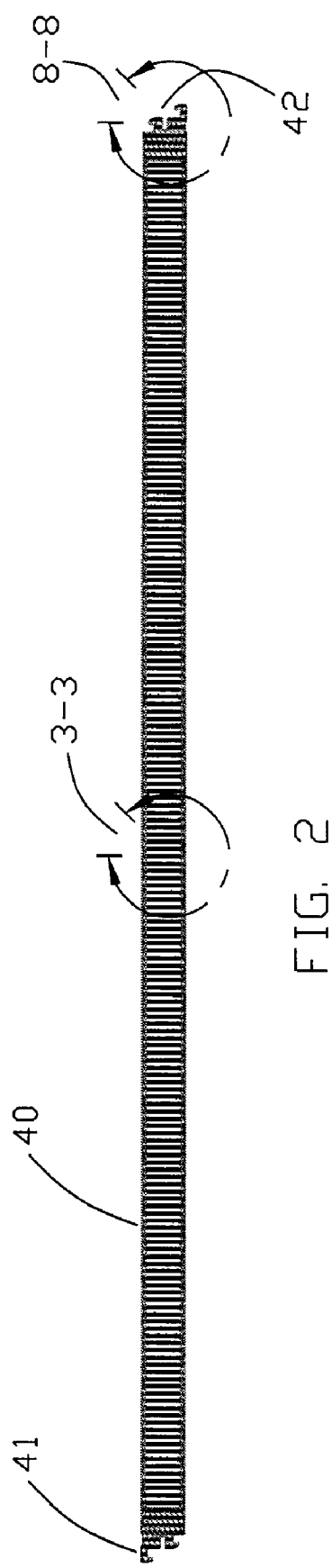
FIG. 2 is a schematic vertical cross sectional view of a pultruded composite laminate panel in a preferred embodiment, in which the clinched 3-D Z-axis fibers have been cured on the fly, showing side details. This panel would be used as a new lightweight matting surface for temporary military aircraft runway use.

FIG. 2 illustrates a vertical cross-section of one preferred embodiment. It is a cross-section of a panel 40 that is 1.5 inches thick and 48 inches wide and it will be used as a temporary runway/taxiway/or ramp for military aircraft. In remote locations, airfields must be erected quickly and be lightweight for transporting by air and handling. Panel 40 of FIG. 2 achieves these goals. Because it has been reinforced with the Z-axis groupings of fiber filaments, the panel can withstand the weight of aircraft tires, as well as heavy machinery. Since panel 40 is lightweight, at approximately 3 lbs. per square foot, it achieves a goal for the military, in terms of transportation and handling. Because 40 is pultruded automatically by the process illustrated in FIG. 1, it can be produced at an affordable price for the military. Also shown in FIG. 2 are edge connections, 41 and 42. These are identical but reversed. These allow the runway panels 40 also known as matting, to be connected and locked in place. Clearly, other applications for these composite structures exist beyond this one embodiment.

Figure 4:
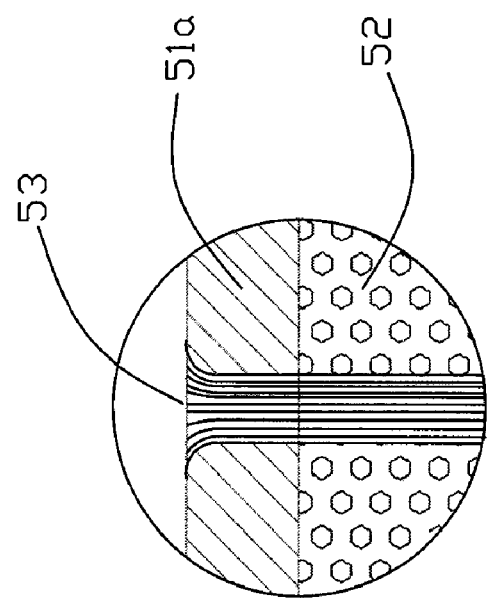
FIG. 4 is a magnified view taken along lines 4-4 of FIG. 3.
Figure 3:
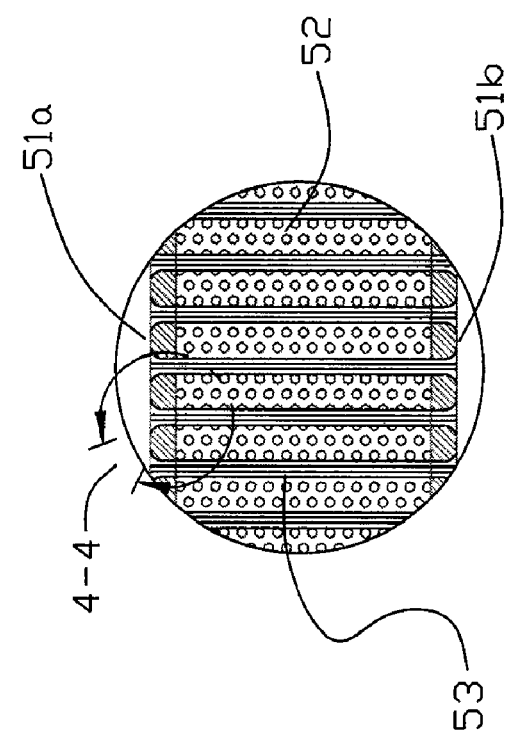
FIG. 3 is a magnified view taken along lines 3-3 of FIG. 2.

FIG. 3 is a magnified view taken along lines 3-3 of FIG. 2. FIG. 3 shows the cross section of the composite laminate structure, including the upper and lower skins 51a and 51b respectfully. Core 52, which is shown as foam, clearly could be other core material such as end-grain balsa wood. Also shown are the several 3-D Z-axis groupings of fiber filaments 53, which are spaced in this embodiment every 0.25 inches apart and are approximately 0.080 inches in diameter. It can be seen from FIG. 3 that the groupings of fiber filaments 53 are clinched, or riveted to the outside of the skins, 51a and 51b. FIG. 4 is a magnified view taken along lines 4-4 of FIG. 3. FIG. 4 shows core material 52 and the upper skin section 51a and lower skin section 51b. These skin sections are approximately 0.125 inches thick in this embodiment and consists of 6 layers of X-Y stitched glass material at 24 oz. per square yard weight. The Z-axis groupings of fiber filaments 53 can be clearly seen in FIG. 4. The clinching or riveting of these filaments, which lock the skin and core together, can clearly be seen.

Figure 5:
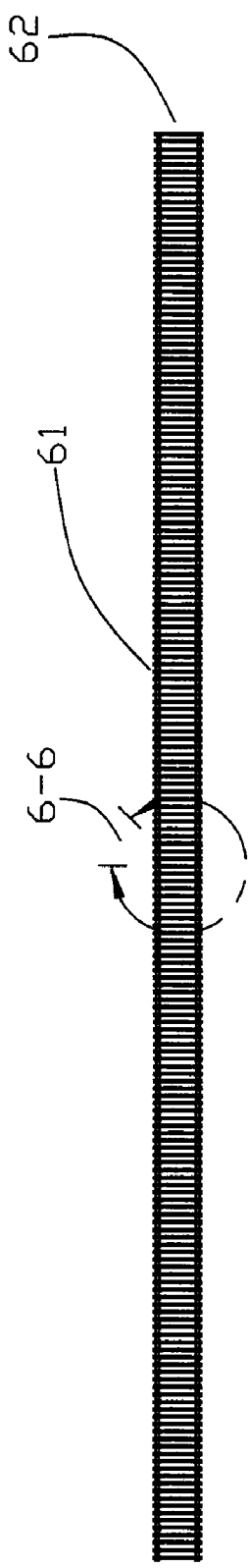
FIG. 5 is a schematic vertical cross-sectional view of the pultruded sandwich panel of the preferred embodiment, just prior to entering the pultrusion die, wherein the 3D Z-axis groupings of fiber filaments have been deposited and they are prepared for clinching and riveting in the die.
Figure 7:
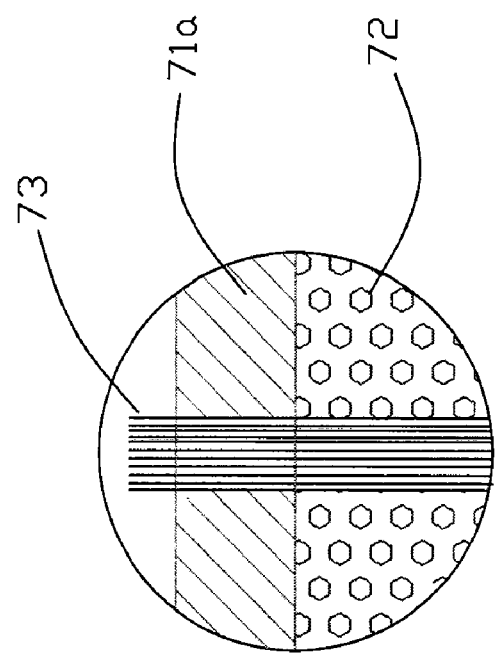
FIG. 7 is a magnified view taken along lines 7-7 of FIG. 6.
Figure 6:
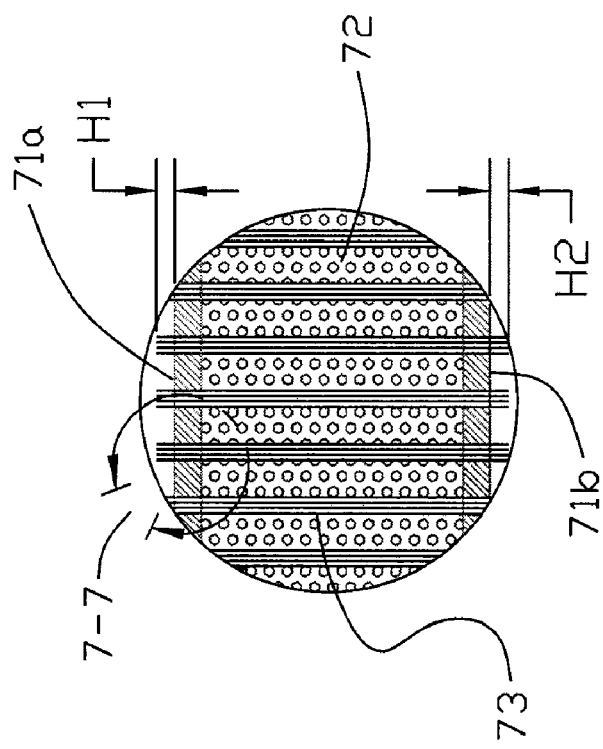
FIG. 6 is a magnified view taken along lines 6-6 of FIG. 5.

FIGS. 2, 3, and 4 show the runway matting material as it would be produced in the method and apparatus of FIG. 1. The schematic section 40 in FIG. 2 is fully cured as it would be leaving pultrusion die 26. Similar drawings of these same sections are shown for the preform of the runway matting material as it would look just prior to entering pultrusion die 26 by FIGS. 5, 6, and 7. FIGS. 5, 6 and 7 correlate with the preform 31 of FIG. 1. FIGS. 2,3, and 4 correlate with the perform 32 and the part 33 of FIG. 1.

FIG. 5 schematically illustrates the entire matting panel 61 as a preform. The end of the panel 62 does not show the details 42, of FIG. 2 for clarity. The lines 6-6 indicate a magnified section that is shown in FIG. 6.

FIG. 6 shows the skins 71a and 71b, the core 72 and the 3-D groupings of Z-axis fiber filaments 73. One can see the egressing of the fiber filaments above and below skins 71a and 71b by a distance H1 and H2, respectively. The lines 7-7 indicate a further magnification which is illustrated in FIG. 7.

FIG. 7 shows the preform with the core 72 and upper skin material 71a and a single group of Z-axis fiber filaments 73. Note the egressed position of the fiber filaments, which after entering the pultrusion die will be bent over and riveted, or clinched, to the composite skin. Because the skins 71a and 71b are made of X-Y material and the grouping of fiber filaments are in the normal direction to X-Y, or the Z-direction, the composite skin in the region of the 3-D grouping of fiber filaments is said to be a three dimensional composite.

Figure 8:
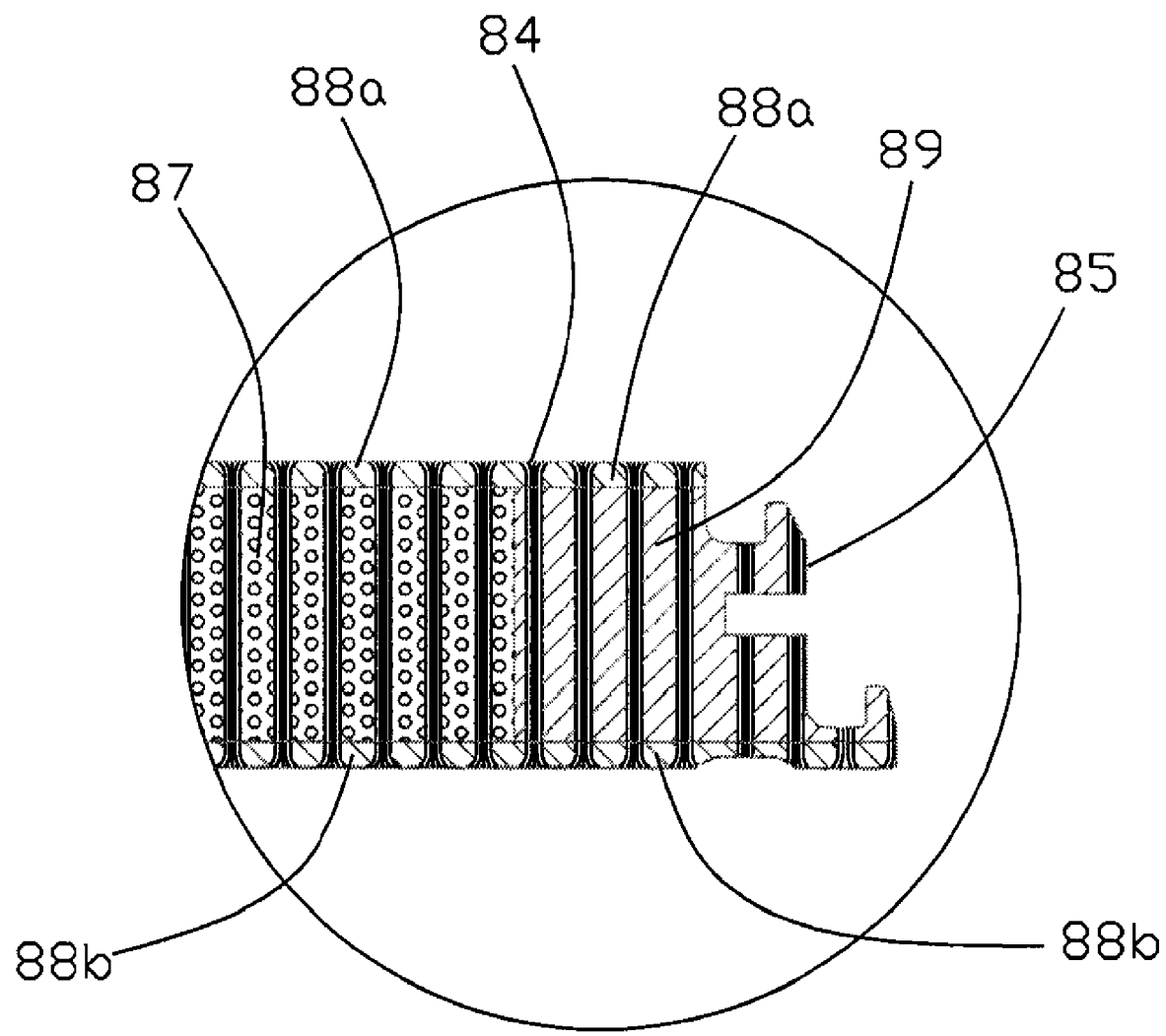
FIG. 8 is a magnified view taken along lines 8-8 of FIG. 2.

FIG. 8 is a magnified view taken along lines 8-8 of FIG. 2 and schematically depicts a core material 87, a skin material 88a and 88b and a new interior composite material 89. As stated this material 89 would consist of X-Y fiber material that is the same as the skin material 88a and 88b but is narrow in width, say 2 to 3 inches wide in this matting embodiment. The 3-D groupings of Z-axis fiber filaments 84 are deposited by the newly developed Z-axis deposition machine 24 in FIG. 1, and are operated independent of the density of the material. The 3-D groupings of fiber Z-axis filaments can be easily deposited through either the core material 87 or the higher density X-Y material 89. The interlocking connecting joint 85 can be either machined into the shape of 85 in FIG. 8 or can be pultruded and shaped by the pultrusion die. In FIG. 8 joint 85 is machined. If it were pultruded, the 3-D groupings of Z-axis fiber filaments in 85 would show riveted or clinched ends. Clearly other interlocking joints or overlaps could be used to connect matting panels.

Figure 9:
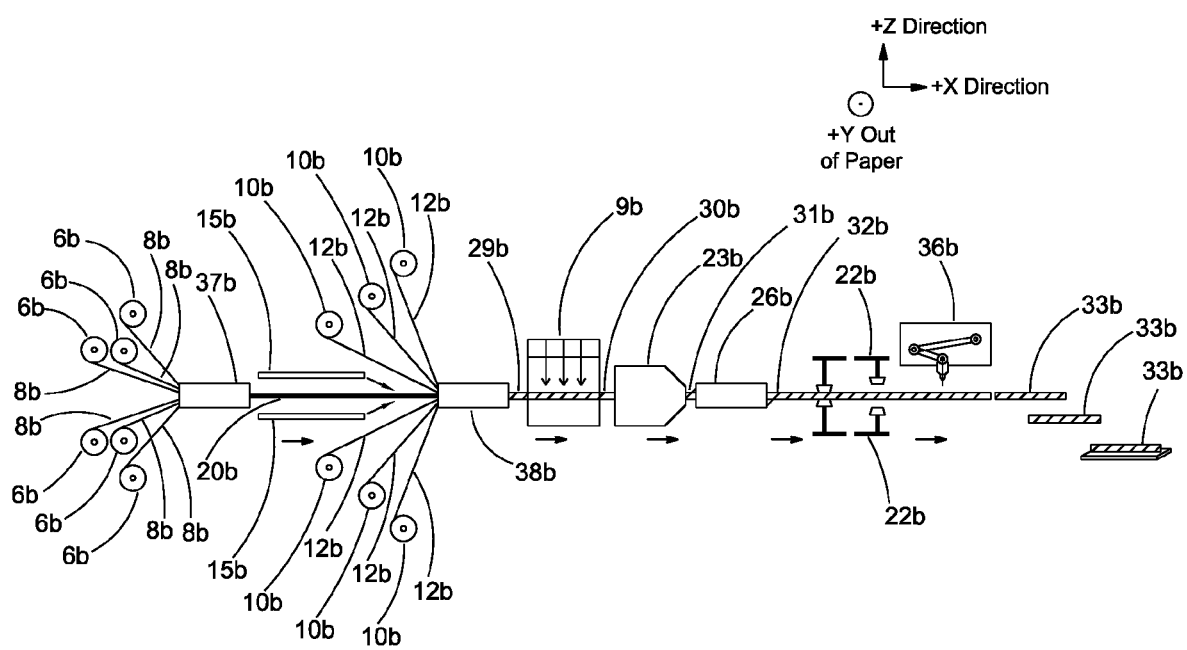
FIG. 9 is a schematic illustration of a method and an apparatus for forming continuously and automatically an embodiment of a 3-D Z-axis reinforced composite laminate structure including a sandwich panel combining high-shear Z-Y partitions and 3D-fiber insertions.

FIG. 9 illustrates embodiments of a method and an apparatus for forming continuously and automatically an embodiment of a 3-D Z-axis reinforced composite laminate structure including a sandwich panel combining high-shear Z-Y partitions and 3D-fiber insertions. The pultrusion direction is from left-to-right (front end of line to rear end of line) in FIG. 9 as shown by the arrows. The key components of the apparatus will become evident through the following description, where like elements are referred to with the same reference numbers, but with a "b" suffix.

Rolls 6b of Z-Y partition material fabric 8b are shown at one end of the apparatus (e.g., left/front end of apparatus/line). The Z-Y partition material fabric 8b is shown coming off of the rolls 6b as an unrolled flat fabric 6b. The fabric 8b is unrolled by the automatic pultrusion process, which includes pulling of a cured panel 32b at grippers 22b near an opposite end of the apparatus (e.g., right/rear end of apparatus/line). The grippers 22b are hand-over-hand grippers 22b that sequentially clamp the cured panel 32b and pull the panel 32b from a curing die 26b. The raw material upstream gets pulled at the same speed as the cured panel 32b.

The Z-Y partition fabric 8b gets pulled into a forming station 37b. The forming station 37b includes tooling that orients the Z-Y partition fabric 8b into a generally Z-Y orientation (roughly 45 degrees relative to, and in between a pure Z-direction and a pure Y-direction; see, for example, element 60b, FIG. 13, element 70b, FIG. 14). The Z-Y partition fabric 8b runs consistently in the pultrusion direction, in the direction of the arrows shown. Angulated foam sections 15b are inserted and nestled on opposite sides of the Z-Y partitions, either above or below the formed Z-Y partitions 20b that are exiting the forming station 37b. These sections of foam 15b may be 4 ft. in length, or 8 ft. in length, for example, and may have a trapezoidal cross section such as foam trapezoidal section 53b shown in FIG. 11. The foam trapezoidal section 53b of FIG. 11 is oriented correctly to be the foam section 15b that is above the Z-Y partitions 20b (in the +Z Direction). Foam trapezoidal section 53b has its longest edge directly under the upper skins 55b of the sandwich. If foam trapezoidal section 53b is rotated 180 degrees along its X-Axis, it becomes the foam trapezoidal section 54b of FIG. 10, and is thus the lower foam section 15b of FIG. 9. The foam sections 15b thus are inserted to fill the interior space above and below the Z-Y partition fabric 8b such that the sum total of the foam 15b and the Z-Y partition fabric 8b form a generally rectangular interior space of the sandwich panel 32b (See, for example, FIG. 10). Upper and lower skins are formed by fabric material 12b that is unrolled by the pultrusion process from rolls 10b. The entire combination of raw material (upper skins 12b, foam section 15b-combined-with-Z-Y partitions 20b, and lower skins 12b) is pulled into forming tooling/tray 38b, and exits as dry preform material 29b.

Dry preform material 29b then enters the 3D insertion process/assembly 9b, where discrete bundles of 3D fiber are inserted through the dry preform material 29b. The discrete bundles of 3D fiber are deposited through upper skins 55b (FIG. 10), combined foam/Z-Y partitions 60b and 70b, and bottom skins 56b in one movement, ending in a severing of the bundles which results in the deposition of discrete bundles. The 3D insertion process/assembly 9b is synchronized with the pultrusion speed of the grippers 22b. The 3D insertion assembly 9b is preferably on a synchronous gantry such that there is no relative motion between the dry preform 29b and the 3D insertion assembly 9b; however in alternative embodiment, relative motion between the 3D insertion assembly 9b and the dry preform 29b is allowed. An example 3D insertion process/assembly used as the 3D insertion process/assembly 9b is shown and described in U.S. Pat. No. 7,105,071, which is incorporated by reference herein as though set forth in full.

Exiting the 3D insertion assembly 9b is a package after insertions 30b, which then enters resin injection tooling 23b. The package of preform becomes fully wetted out in the resin injection tooling 23b and exits as wetted-out package 31b. Key to the wet-out performance in the resin injection tooling 23b is the fact that the discrete bundles of 3D fiber act as straws, or wicking mechanisms, drawing resin to internal Z-Y partition material and internal 3D fiber bundles. The fully wetted-out package 31b then enters pultrusion die 26b where the sandwich panel is cured into an exiting cured panel 32b. After exiting the grippers 22b (shown are two grippers 22b, but, in alternative embodiments, there are multiple grippers 22b, up to four or more, that are all programmed to be synchronous, or load-sharing, as the case may be), a cut-off mechanism, which is preferably also synchronous, cuts the cured panel 32b into predetermined lengths such that a finished panel 33b is stacked and palletized for shipping.

With reference to FIGS. 10-14, an embodiment of a 3-D Z-axis reinforced composite laminate structure including a sandwich panel 40b combining high-shear Z-Y partitions and 3D-fiber insertions (e.g., finished panel 33b, FIG. 9) will be described.

FIG. 10 shows an embodiment of the sandwich panel 40b, which in an exemplary application is about 3 inches thick and 48 inches wide. Bubble circles 12, 13 and 11, 14 show two features of the panel cross section. Shown in bubble circle 11, 14 are foam trapezoidal sections 53b and 54b. Foam trapezoidal section 53b is also shown in FIG. 11. Note that foam trapezoidal section 53b and foam trapezoidal section 54b are identical foam trapezoidal sections, with foam trapezoidal section 54b being an inverted relative to foam trapezoidal section 53b. Shown in bubble 12, 13 is a half foam trapezoidal section 83b, which is also shown in FIG. 12. Also shown in bubble 12, 13 is a Z-Y partition 60b, which is also shown in FIG. 13. The foam trapezoidal sections 53b, 54b, and 83b are longitudinally elongated foam members. Although trapezoidal sections are shown, in alternative embodiments, one or more polygonal, rectilinear, and/or curvilinear sections are used in the sandwich panel 40b. For example, but not by way of limitation, triangular sections (e.g., solid foam, hollow) such as those shown and described in U.S. Pat. No. 4,223,053 may be used.

FIG. 10 also shows an upper skin 55b and a lower skin 56b forming the outside surfaces of the sandwich panel 40b. Additionally, 3D fiber bundles/insertions 58b are shown tying all materials (skins, foam sections, and Z-Y partitions). Exemplary 3D fiber bundles/insertions used as 3D fiber bundles/insertions 58b are shown and described in U.S. Pat. No. 7,105,071, which is incorporated by reference herein as though set forth in full.

FIG. 11 is a vertical cross-sectional view of an embodiment of the trapezoidal foam cross section 53b, which by example may be 48 inches long, or 96 inches long, but in each case with the cross section shown in FIG. 11.

FIG. 12 is a vertical cross-sectional view of an embodiment of the half-trapezoidal foam member 83b, which as the name implies is exactly a section 53b cut in half.

FIG. 13 is a vertical cross-sectional view of an embodiment of a Z-Y partition 60b that is oriented in the +Z-direction and −Y-direction at substantially 45 degrees relative to horizontal. Although the Z-Y partitions will be shown and described here as being oriented in the Z-direction and Y direction at substantially 45 degrees relative to horizontal, in alternative embodiments, the Z-Y partitions are oriented in the Z-direction and Y direction at an angle between 0 degrees and 90 degrees relative to horizontal. Upper mating portion 61b is that portion of the Z-Y partition that mates with the interior of the upper skin 55b. Likewise, lower mating portion 62b is that portion of the Z-Y partition that mates with the interior of the lower skin 56b.

FIG. 14 is a vertical cross-sectional view of another embodiment of a Z-Y partition 70b. The Z-Y partition 60b is repeated again in FIG. 14, and is shown with the Z-Y partition 70b, which is oriented in the +Z-direction and +Y-direction at substantially 45 degrees relative to horizontal. Upper mating portion 71b is that portion of the Z-Y partition that mates with the interior of the upper skin 55b. Likewise, the lower mating portion 72b is that portion of the Z-Y partition that mates with the interior of the lower skin 56b.

A slight gap between an end portion 71b, 72b of Z-Y partition 70b and an end portion 61b, 62b of Z-Y partition 60b is shown in FIG. 14 for clarity. In reality, the end portions 71b, 72b and 61b, 60b of the two Z-Y partitions 70b and 60b may be butt-jointed, overlapped, or otherwise joined/mated to form a better connection to the skins 55b, 56b and the 3D fiber insertions 58b. A butt-jointed configuration is shown in FIG. 10 as butt joint 80b. In an alternative embodiment, the end portions 71b, 72b and 61b, 60b of the two Z-Y partitions 70b and 60b are overlapped adjacent to the first/upper skin 55b and the second/lower skin 56b to form a localized thicker skin. This localized thicker skin can have a positive structural effect as stress concentrations of a panel under load may find one of the first mode of failures being the connection, or node, of the Z-Y partitions and the skins. By overlapping these partitions, a localized increase in cross sectional area is provided, thus minimizing the effect of the aforementioned stress concentration. Further, the insertion of Z-axis fibers at this location, or node, help tie the entire localized region together, further retarding any separation under load.

Thus, the sandwich panel 40b combines a series of Z-Y partitions and a 3D fiber deposition process to create the 3-D Z-axis reinforced composite laminate structure. The Z-Y partitions, along with the skin materials and the interior foam, are fed continuously at the front end of a pultrusion line via the use of unique dispensing tooling. These preforms are then subjected to computerized, deposition of discrete bundles of 3D fiber, the bundles being deposited through upper skins, combined foam/Z-Y partitions, and bottom skins in one movement, ending in a severing of the bundles which results in the deposition of discrete bundles.

The new preform is then subjected to resin impregnation (in an alternative embodiment, the resin may already be "attached" or "prepregged" to the fiber bundles) and then cured in a die system. The entire process is automated and requires very little supervision by operators of the machinery.

The 3D fiber insertions provide significant benefits to the Z-Y partitions in that both have enhanced structural properties due to the presence of the other. Previous art in pultrusion has included examples of forms of Z-Y partitions, pultruded with either foam or mandrels (resulting in hollow interior sections where the foam would otherwise be located). All of these pultrusion panels, when subjected to loads, failed in either through-thickness compression, separation of the Z-Y partitions at their intersections to either the top or bottom skins, or in compression buckling of the Z-Y partitions themselves. The 3D fiber depositions retard, delay, or eliminate these failure points. First, in through-thickness compression, each 3D fiber bundle can exhibit 160 lbs. of compressive force resistance before buckling. At 4 bundles per square inch (or 576 per square foot), this represents 92,160 pounds-per-square-foot buckling resistance of the panel, wherein the Z-Y partitions and the foam do not have to be the only internal elements resisting through-thickness buckling. Secondly, the failure-separation at the intersection of Z-Y partitions and the skins is virtually eliminated. The 3D bundle connections, which are extremely effective in eliminating delamination of the skins from foam, now provide delamination resistance between the connecting points of the Z-Y partitions and the skins. Thirdly, during certain bending applications, the Z-Y partition may want to buckle due to "long-column-buckling" phenomena, as described by Euler's buckling formulae. The critical buckling of a section is inversely proportional to the length$^2$ and this length gets effectively reduced at many locations due to the connection with stabilizing 3D fiber bundles.

Not only are Z-Y partitions enhanced by the 3D fiber, but the 3D fiber is also enhanced by the Z-Y partitions. First, the long column buckling of the 3D fiber (even though traditionally stabilized by foam) are improved as the effective length of the 3D fibers are lowered due to the connection with the Z-Y partitions. Secondly, the core shear modulus of 3D fiber bundles, in combination with foam and skins, is traditionally low. Many applications require the panel to be significantly stiffer (more resistant to bending and deflections) and the addition of the Z-Y partitions enhances the panels significantly. For example, the traditional 3D fiber panel developed by Ebert Composites Corporation, same assignee as the present application when filed, known and trademarked as Transonite®, has a shear modulus of between 2000 and 8000 psi, depending on 3D insertion patterns and density. By adding the Z-Y partitions, the shear modulus of the panel is increased to 35,000 to 50,000 psi, depending on the thickness and ply schedule of the Z-Y partitions themselves.

An advantage of the present 3-D Z-axis reinforced composite laminate structure including a sandwich panel combining high-shear Z-Y partitions and 3D-fiber insertions includes, but not by way of limitation, a higher shear modulus and a stiffer panel with less deflection and higher load-carrying capability. This is important when the sandwich panel is used as a replacement for other high stiffness materials (that are much heavier) such as steel and concrete. Applications for the sandwich panel include, but not by way of limitation, bridge decks (pedestrian and vehicular), mud mats (used as temporary landing mats in fields, temporary aircraft runways, temporary roads for oil and gas rigging traveling over sensitive areas, tundra, and the like), walls requiring low deflections, and floors of trucks/trailers and the like, replacements where sandwich panels use balsa as a core or high-shear-honeycomb, aircraft pallets, and containers.

Another advantage of the sandwich panel is that the use of the Z-Y partition does not add significantly to the weight of a traditional panel nor to the automated production capability (either complexity or speed of the pultrusion process). The sandwich panel also has a longer fatigue life than a traditional panel.

A further advantage of the sandwich panel is the enhancement of both Z-Y partitions and 3D fiber insertions, above the performance of either by themselves, as explained above.

A still further advantage of the sandwich panel is that shear can be tailored by ply schedule of Z-Y partitions. In alternative embodiments, each Z-Y partition has one more layers/plies (e.g., 2 layers, 3 layers). The Z-Y partition is made of a quadraxial fiber fabric material, having orientation of fiber in the 0 degree/90 degree and +/−45 degree directions, when the fiber material is laid flat on a horizontal surface. When the same material is placed in the disclosed Z-Y direction, there are fiber elements in the X-direction, the Z-Y direction, and the Z-Y-X direction. By varying the quantity and direction of this quadraxial fiber fabric, the shear values and other performance characteristics can be tailored in an infinite variety/family of values.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed:

1. A composite laminate structure, comprising:
   a first skin;
   a second skin;
   a core between the first skin and the second skin, the core including adjacent core sections and a Z-Y partition separating the adjacent core sections; and
   a plurality of distinct groupings of Z-axis fibers that extend from the first skin to the second skin through the adjacent core sections and the Z-Y partition separating the adjacent core sections.

2. The composite laminate structure of claim 1, wherein the groupings of Z-axis fibers are generally perpendicular to the first skin and the second skin.

3. The composite laminate structure of claim 1, wherein the ends of the Z-axis fibers extend into the first skin and second skin.

4. The composite laminate structure of claim 1, wherein the first skin and the second skin comprise an X-Y material.

5. The composite laminate structure of claim 1, wherein the adjacent core sections are made of foam.

6. The composite laminate structure of claim 1, wherein the Z-Y partition extends substantially at 45 degrees relative to horizontal.

7. The composite laminate structure of claim 1, wherein the adjacent core sections include respective portions vertically disposed relative to each other and separated by the Z-Y partition, and the plurality of distinct groupings of Z-axis fibers extend from the first skin to the second skin through the respective vertically disposed sections and the Z-Y partition separating the vertically disposed sections.

8. The composite laminate structure of claim 1, wherein the first skin and the second skin comprise glass fibers.

9. The composite laminate structure of claim 1, wherein the Z-Y partition comprises glass fibers.

10. The composite laminate structure of claim 1, wherein the core sections are longitudinally elongated and have a polygonal cross-section.

11. The composite laminate structure of claim 10, wherein the core sections include a combination of polygonal and half polygonal core sections that combine to form a substantially planar core.

12. The composite laminate structure of claim 1, wherein the composite laminate structure includes a shear modulus of at least 35,000 psi.

13. The composite laminate structure of claim 1, wherein the composite laminate structure includes a plurality of respective, separate Z-Y partitions between respective adjacent core sections.

14. The composite laminate structure of claim 1, wherein the Z-Y partition extends in a +Z direction and a +Y direction.

15. The composite laminate structure of claim 1, wherein the Z-Y partition extends in a +Z direction and a −Y direction.

16. The composite laminate structure of claim 1, wherein the Z-axis fibers wick liquid resin when the composite laminate structure is subjected to liquid resin, aiding the cured integrity of the entire composite laminate structure.

17. The composite laminate structure of claim 1, wherein the Z-Y partition includes one or more Z-Y partitions, the one or more Z-Y partitions including end portions that overlap adjacent to the first skin and the second skin to form a localized thicker skin.

* * * * *